US012640435B2

(12) United States Patent
Lu et al.

(10) Patent No.: US 12,640,435 B2
(45) Date of Patent: May 26, 2026

(54) METHOD FOR MANUFACTURING AN ELECTROCHEMICAL CELL HAVING A SEPARATOR MEMBRANE FOR SEPARATION OF ELECTRODES IN THE ELECTROCHEMICAL CELL AND A DEVICE THEREOF

(71) Applicant: Nano and Advanced Materials Institute Limited, Hong Kong (HK)

(72) Inventors: Shengbo Lu, Hong Kong (HK); Yong Zhu, Hong Kong (HK); Wai Yin Wong, Hong Kong (HK); Wing Lung Hon, Hong Kong (HK); Qiuhong Li, Hong Kong (HK); Chenmin Liu, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 889 days.

(21) Appl. No.: 17/851,065

(22) Filed: Jun. 28, 2022

(65) Prior Publication Data

US 2023/0022742 A1     Jan. 26, 2023

Related U.S. Application Data

(60) Provisional application No. 63/221,445, filed on Jul. 13, 2021.

(51) Int. Cl.
| | |
|---|---|
| *H01M 50/411* | (2021.01) |
| *H01M 50/403* | (2021.01) |
| *H01M 50/449* | (2021.01) |

(52) U.S. Cl.
CPC ....... *H01M 50/411* (2021.01); *H01M 50/403* (2021.01); *H01M 50/449* (2021.01)

(58) Field of Classification Search
CPC ... H01M 50/403; H01M 50/46; H01M 50/489
See application file for complete search history.

(56) References Cited

U.S. PATENT DOCUMENTS

2001/0005563 A1*   6/2001  Yamamoto .......... H01M 50/489
                                                        429/300
2012/0248028 A1   10/2012  Antheunis et al.
(Continued)

FOREIGN PATENT DOCUMENTS

| CN | 103421208 B | 4/2015 |
|---|---|---|
| CN | 104882581 A | 9/2015 |

(Continued)

OTHER PUBLICATIONS

Van Ginkel et al. (Handbook for Cleaning/Decontamination of Surfaces I. Johansson and P. Somasundaran (Editors) 2007 Elsevier B.V. 4. Water-Soluble Polymers, p. 682, second paragraph) (Year: 2007).*

(Continued)

*Primary Examiner* — Matthew T Martin
*Assistant Examiner* — Bartholomew A Hornsby
(74) *Attorney, Agent, or Firm* — IDEA Intellectual Limited; Sam T. Yip

(57) ABSTRACT

The invention discloses a method of manufacturing an electrochemical cell having a polymer separator membrane for separation of electrodes in the electrochemical cell, including providing a cathode and providing a polymer separator membrane. At least one cycle of irradiating the polymer separator membrane is performed by an energy beam under a radiation dose ranging between 50 and 200 kGy to effect a cross-linking in the polymer separator membrane. The polymer separator membrane is maintained at a temperature between 30° C. and 70° C. An anode is then provided. Subsequently, the polymer separator membrane is (Continued)

110                               120 compressed between the cathode and the anode. An electrolyte is provided to form the electrochemical cell.

10 Claims, 9 Drawing Sheets

(56) References Cited

U.S. PATENT DOCUMENTS

| | | | |
|---|---|---|---|
| 2012/0248032 A1 | 10/2012 | Van Berchum et al. | |
| 2014/0242443 A1* | 8/2014 | Hirai | H01M 50/414 |
| | | | 429/144 |
| 2015/0129428 A1* | 5/2015 | Antheunis | H01M 8/1072 |
| | | | 204/627 |
| 2015/0132681 A1* | 5/2015 | Van Berchum | B01D 67/0083 |
| | | | 427/508 |
| 2016/0301052 A1* | 10/2016 | Adams | B32B 27/32 |
| 2017/0263908 A1* | 9/2017 | Laicer | H01M 50/446 |
| 2019/0200631 A1* | 7/2019 | Briggs | H01M 50/491 |

FOREIGN PATENT DOCUMENTS

| | | |
|---|---|---|
| CN | 104993081 B | 6/2017 |
| JP | 3747963 B2 * | 2/2006 |
| KR | 102073852 B1 | 1/2020 |

OTHER PUBLICATIONS

Zhang, "A review on the separators of liquid electrolyte Li-ion batteries." Journal of Power Sources, 164, 351-364 (2007).

Jeong, et al., "Closely packed SiO2 nanoparticles/poly(vinylidene fluoride-hexafluoropropylene) layers-coated polyethylene separators for lithium-ion batteries." Journal Power Sources, 196, 6716-6722 (2011).

Zhang, et al., "Al2O3-coated porous separator for enhanced electrochemical performance of lithium sulfur batteries.", Electrochimica Acta, 129, 55-61 (2014).

Kim, et al. "Electron-beam-irradiated polyethylene membrane with improved electrochemical and thermal properties for lithium-ion batteries". J Appl Electrochem, 44, 345-352 (2014).

Choi, et al. "Electron beam induced strong organic/inorganic grafting for thermally stable lithium-ion battery separators." Applied Surface Science, 444, 339-344 (2018).

1st Office Action of the corresponding China patent application No. 202210763725.0 mailed on Jul. 11, 2025.

* cited by examiner

110

120

1100

A

120'

150

10

A

120A

120'

150

<u>20</u>

110
140 130
140 122'
130
150

<u>B</u> 140 130
130A
122A 122'

810

850     860

910

950     960

1010

1030

1020

1040

METHOD FOR MANUFACTURING AN ELECTROCHEMICAL CELL HAVING A SEPARATOR MEMBRANE FOR SEPARATION OF ELECTRODES IN THE ELECTROCHEMICAL CELL AND A DEVICE THEREOF

CROSS REFERENCE OF RELATED APPLICATION

This application claims the benefit of U.S. Provisional Patent Application No. 63/221,445 filed Jul. 13, 2021, which is incorporated herein by reference in its entirety.

COPYRIGHT NOTICE

FIELD OF THE INVENTION

The invention relates to the technical field of electrochemical cells. In particular, it relates to a modified separator membrane for separation of electrodes in an electrochemical cell.

BACKGROUND OF THE INVENTION

Lithium-ion batteries are used in a wide variety of electronic devices such as computers, mobile phones, and electric vehicles. In addition to the current applications, batteries are being considered for use in wearable electronics due to their high energy densities, stable cycle performances, and light weights. With the increase in capacity loading requirements for different practical applications, the need to meet safety standards for lithium-ion batteries has become a challenge. A thermally stable separator for separation of electrodes in the electrochemical cell is needed for a safe lithium-ion battery.

China Patent CN103421208 discloses a preparation method of cross-linking a polyethylene porous diaphragm. The polyethylene porous diaphragm is soaked in a volatile solution containing an initiator and a cross-linking agent. The polyethylene porous diaphragm absorbs the initiator and cross-linking agent. The polyethylene porous diaphragm is irradiated. The initiator and cross-linking agent react, and then a cross-linking reaction is triggered to render the polyethylene porous diaphragm less susceptible to shrinkage at high temperatures.

China Patent CN104882581A discloses a lithium-ion battery diaphragm and a preparation method thereof. The diaphragm is prepared by rinsing it in a solution having siloxane containing ethylene and a polymerization inhibitor. The irradiation of the diaphragm leads to a grafting reaction between the crosslinkers and polyethylene diaphragm. Korean Patent KR102073852B1 discloses a silane-grafted polyolefin solution. This solution includes polyolefin having a weight average molecular weight of 200,000 or more, a diluent, an alkoxy group-containing vinylsilane, and an initiator. The solution facilitates cross-linking reaction. CN104882581A and KR102073852 employ chemicals to facilitate the cross-linking reaction. However, these treatments can only be applied during the separator extrusion process. For an already set and formed separator membrane, these chemical treatments cannot be used.

SUMMARY OF THE INVENTION

This section is for the purpose of summarizing some aspects of embodiments of the invention and to briefly introduce some further embodiments. In this section, as well as in the abstract and the title of the invention of this application, simplifications or omissions may be made to avoid obscuring the purpose of the section, the abstract and the title, and such simplifications or omissions are not intended to limit the scope of the invention.

The present invention has been made in view of the above-mentioned problems of a physical treatment method that facilitate the cross-linking reaction to set and formed separator membrane for electrodes in an electrochemical cell.

Accordingly, one aspect of the present invention provides a method for manufacturing an electrochemical cell having a separator membrane for separation of electrodes in the electrochemical cell. The method includes providing a cathode and providing a polymer separator membrane. At least one cycle of irradiating the polymer separator membrane is performed by an energy beam under a radiation dose ranging between 50 and 200 kGy to effect a cross-linking in the polymer separator membrane. The polymer separator membrane is maintained at a temperature between 30° C. and 70° C. An anode is then provided. Subsequently, the polymer separator membrane is compressed between the cathode and the anode. An electrolyte is provided to form the electrochemical cell.

In a further embodiment of the present invention, after performing at least one cycle of irradiating the polymer separator membrane by the energy beam, the polymer separator membrane has a gel content of cross-linked polymer separator membrane between 30% and 90%.

In a further embodiment of the present invention, the polymer separator membrane includes polypropylene, polyethylene, polyvinylidene difluoride, polyimide, polyacrylonitrile or combinations thereof.

In a further embodiment of the present invention, after compressing the polymer separator membrane between the cathode and the anode, the polymer separator membrane has a thickness in a range between 3 to 30 μm.

In a further embodiment of the present invention, preparing the polymer separator membrane further includes applying polymeric binders on opposing sides of the polymer separator membrane and disposing a plurality of ceramic particles in the polymeric binders.

In a further embodiment of the present invention, the ceramic particles in the polymer binder are selected from CaO nanoparticles, MgO nanoparticles, $Al_2O_3$ nanoparticles, $B_2O_3$ nanoparticles, $SiO_2$ nanoparticles, $ZrO_2$ nanoparticles, $SnO_2$ nanoparticles, nanoclay, or a combination thereof.

In a further embodiment of the present invention, the polymeric binder includes silane, acrylate, epoxy, urethane, polyolefin, ether, or a combination thereof.

In a further embodiment of the present invention, treating the polymer separator membrane with at least one cycle of irradiation by an energy beam further includes performing a first irradiation to the polymer separator membrane at a first radiation dose for a first duration and performing a second irradiation at a second radiation dose at a second duration. The first radiation dose is different from the second irradiation, and the first duration is different from the second duration.

In a further embodiment of the present invention, preparing the polymer separator membrane further includes manufacturing the polymer separator membrane by wet or dry extrusion, electrospinning, melt spinning, or a combination thereof.

In a further embodiment of the present invention, an electron beam performs at least one cycle of irradiating the polymer separator membrane.

In a further embodiment of the present invention, a gamma ray performs at least one cycle of irradiating the polymer separator membrane.

Another aspect of the present invention provides an electrochemical cell including a cathode, an anode, an irradiated polymer separator membrane has a coating, and an electrolyte. The coating includes a plurality of ceramic particles in a polymer binder. The irradiated polymer separator membrane has cross-linking chemical bonds. It is cross-linking-agent free and initiator free, and it has a shrinkage rate less than 30% at 140° C.

In a further embodiment of the present invention, the irradiated polymer separator membrane includes polypropylene, polyethylene, polyvinylidene difluoride, polyimide, polyacrylonitrile or combinations thereof.

In a further embodiment of the present invention, the irradiated polymer separator membrane has a gel content in a range between 30% and 90%.

In a further embodiment of the present invention, the irradiated polymer separator membrane has a thickness in a range between 3 to 30 μm.

In a further embodiment of the present invention, the ceramic particles are selected from CaO nanoparticles, MgO nanoparticles, $Al_2O_3$ nanoparticles, $B_2O_3$ nanoparticles, $SiO_2$ nanoparticles, $ZrO_2$ nanoparticles, $SnO_2$ nanoparticles, nanoclay, or a combination thereof.

In a further embodiment of the present invention, the polymeric binder is selected from silane, acrylate, epoxy, urethane, polyolefin, ether, or a combination thereof.

BRIEF DESCRIPTION OF THE DRAWINGS

In order to more clearly illustrate the technical solutions of the embodiments of the present invention, the drawings needed to be used in the description of the embodiments will be briefly introduced below. It is obvious that the drawings in the following description are only some embodiments of the present invention, and it is obvious for those skilled in the art to obtain other drawings based on these drawings without inventive exercise, in which.

4

Figure 3A:
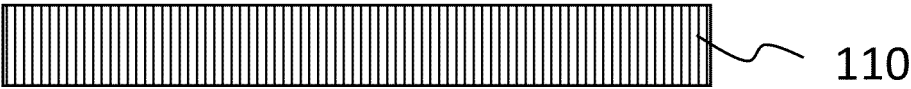
FIGS. 3A to 3E are schematic diagrams showing a method of manufacturing an electrochemical cell by a polymer separator membrane and polymeric binders with ceramic particles.
Figure 3B:
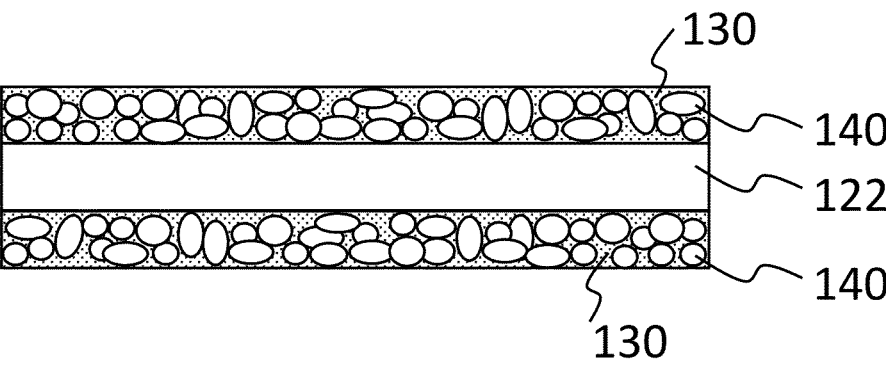
Figure 3C:
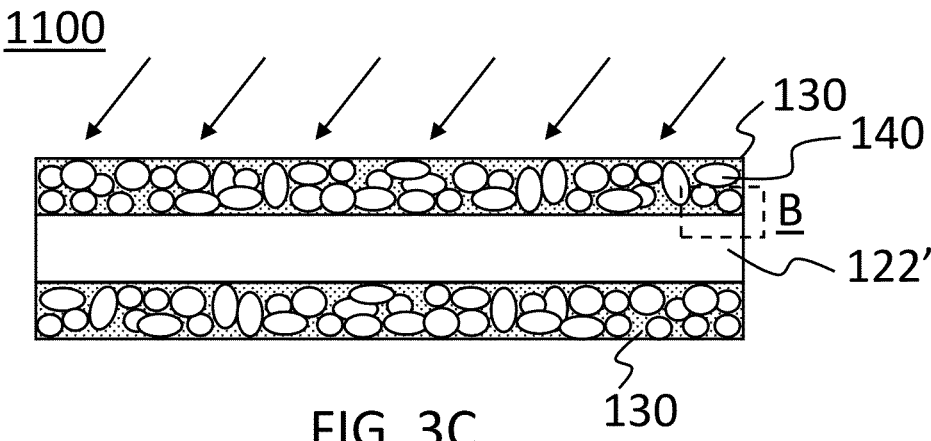
Figure 4:
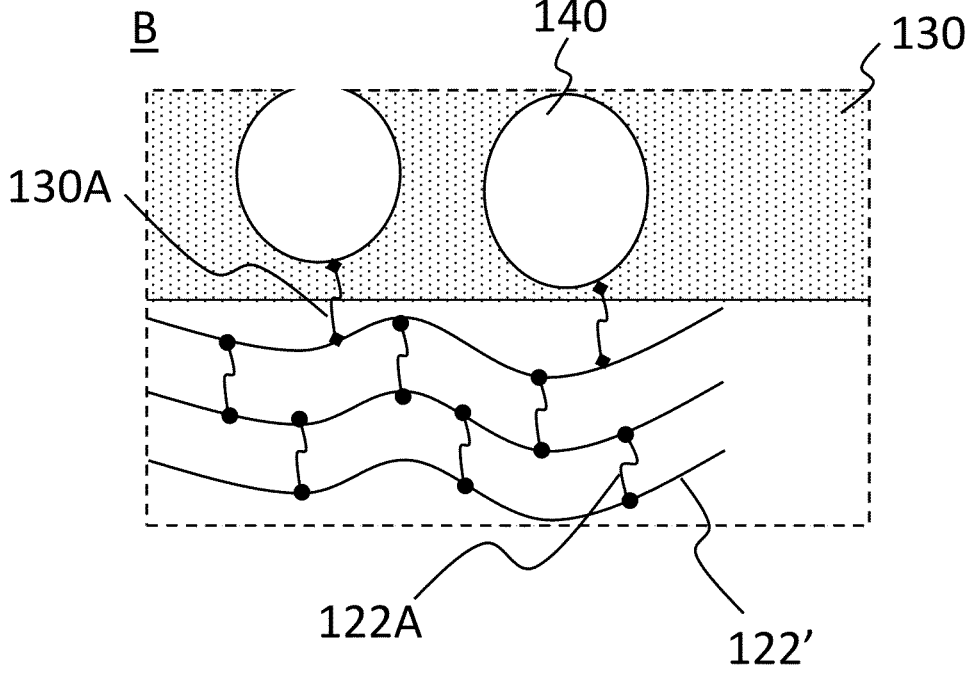
Figure 5:
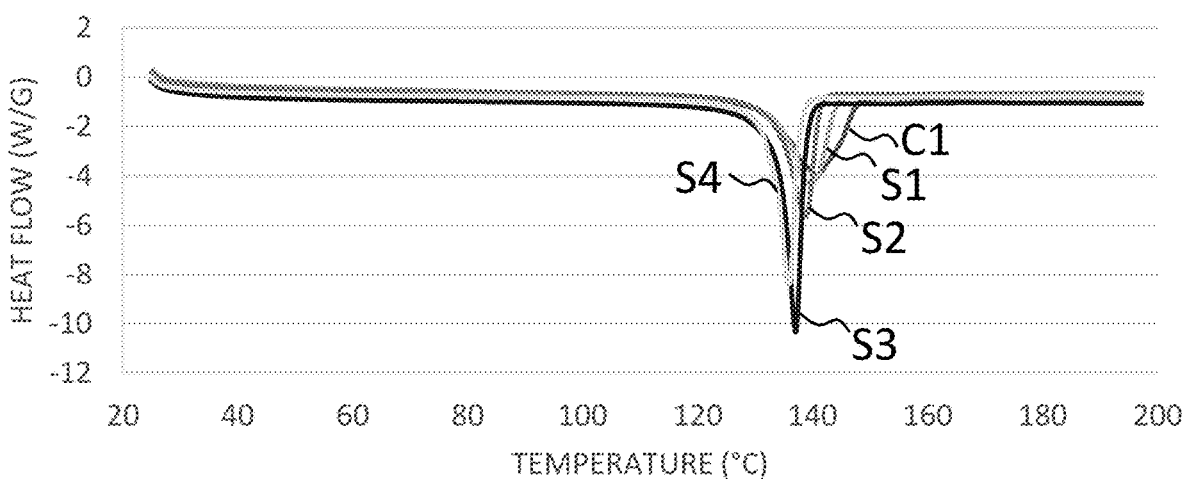
Figure 8A:
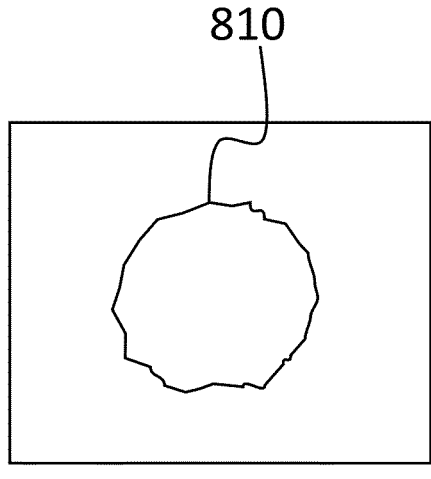
Figure 8B:
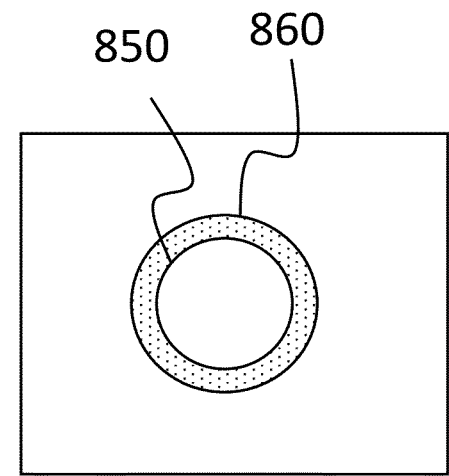
Figure 9A:
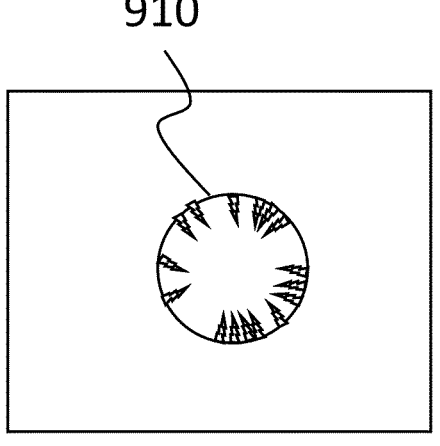
Figure 9B:
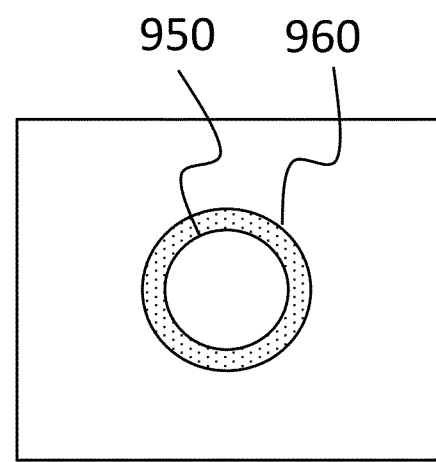
Figure 10A:
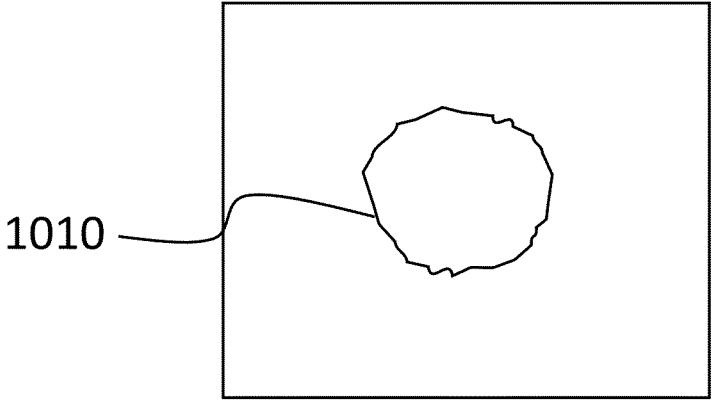
Figure 10B:
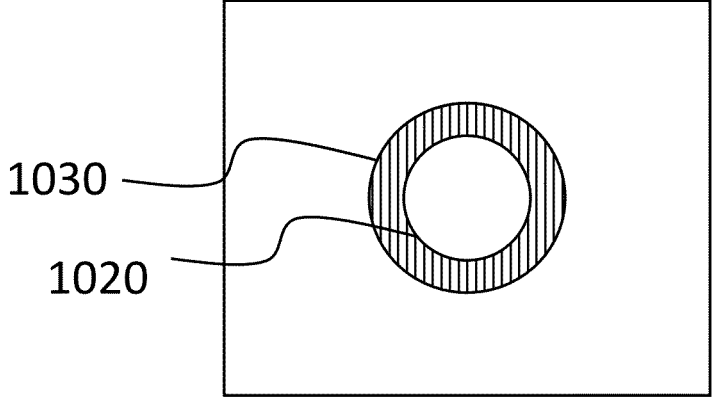
Figure 10C:
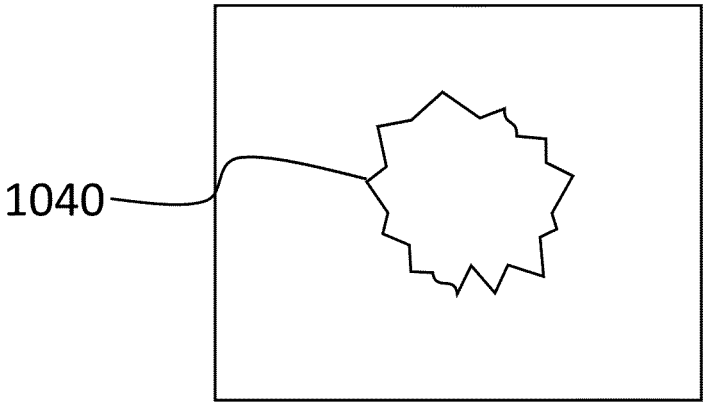

FIG. 4 is an enlarged view of area B in FIG. 3C showing the bonding relationship between the irradiated polymer separator membrane;

FIG. 5 is a differential scanning calorimetry (DSC) analysis graph of Examples 1 to 4 and a Comparative Example 1;

FIGS. 6A to 6E are SEM images of Examples 5 to 8 and a Comparative Example 2 respectively;

FIGS. 7A to 7E are SEM images of Example 5 to 8 and a Comparative Example 2 respectively after 140° C. heat treatment for 1 hour;

FIGS. 8A and 8B are schematic diagrams of a hot nail test for a separator membrane;

FIGS. 9A and 9B are schematic diagrams of a hot nail test for a polymer separator membrane according to an embodiment of the present invention; and FIGS. 10A to 10C are schematic diagrams of a hot nail test for a separator membrane.

DETAILED DESCRIPTION

In order to make the aforementioned objects, features and advantages of the present invention comprehensible, embodiments accompanied with figures are described in detail below.

In the following description, numerous specific details are set forth in order to provide a thorough understanding of the present invention, but the present invention may be practiced in other ways than those specifically described and will be readily apparent to those of ordinary skill in the art without departing from the spirit of the present invention, and therefore the present invention is not limited to the specific embodiments disclosed below.

Figure 1A:
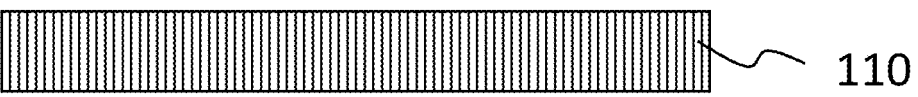
FIGS. 1A to 1E are schematic diagrams showing a method of manufacturing an electrochemical cell having a polymer separator membrane for separation of electrodes in the electrochemical cell according to an embodiment of the present invention.
Figure 1B:

The present invention provides a method of manufacturing an electrochemical cell having a polymer separator membrane for separation of electrodes in the electrochemical cell. Turning to FIG. 1A, a cathode 110 is provided. The cathode is alkaline metal salts, transition metal salts, and their complexes. Next, turning to FIG. 1B, a polymer separator membrane 120 is provided. The polymer separator membrane 120 is in the shape of a plane and has at least two flat surfaces opposite each other. The polymer separator membrane 120 can be made from polypropylene, polyethylene, polyvinylidene difluoride, polyimide, polyacrylonitrile or combinations thereof. The polymer separator membrane can be made by wet or dry extrusion, electrospinning, melt spinning, or a combination thereof.

Figure 1C:
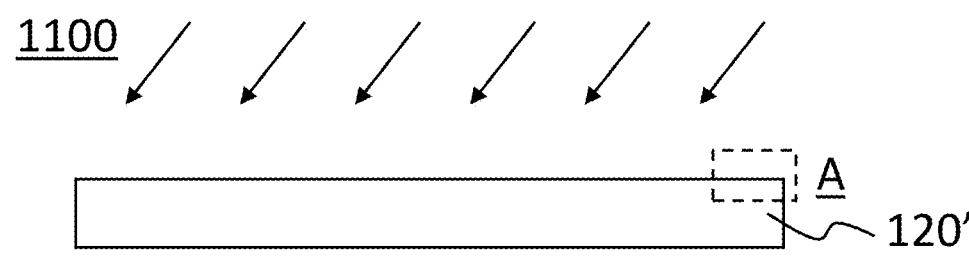

Turning to FIG. 1C, the polymer separator membrane 120 undergoes irradiation. An energy beam 1100 is shone onto the polymer separator membrane 120. In one embodiment, the energy beam 1100 is an electron beam. In another embodiment, the energy beam 1100 is a gamma ray. The energy beam has a radiation dose ranging between 50 and 200 kGy. The duration of irradiation may fall between 1 hour to 20 hours or 1 hour to 4 hours. An irradiation ambient temperature has to be kept between 40° C. and 100° C.

Under high-radiation-dose irradiation, for example, above 80 kGy, heat generates inside the separators. The temperature of the polymer separator membrane may increase beyond a shrinkage threshold or even the melting point of the polymer separator membrane. Interspersed irradiation during a longer period of time can prevent heat damage under high-radiation-dose irradiation. For example, if the temperature exceeds 120° C., a significant shrinkage of the polymer separators membrane may happen. In one embodiment, the irradiation occurs in more than one cycle. For instance, a first irradiation is performed under 50 kGy for 1 hour, and the polymer separator temperature is maintained between 30° C. and 50° C. A second irradiation is performed under 100 kGy for 2 hours, and the polymer separator membrane temperature is maintained between 30° C. and 70° C. It should be understood that different combinations of the radiation dose, duration, and temperature all fall into the scope of the present invention given that those values are within the provided range.

Figure 2:
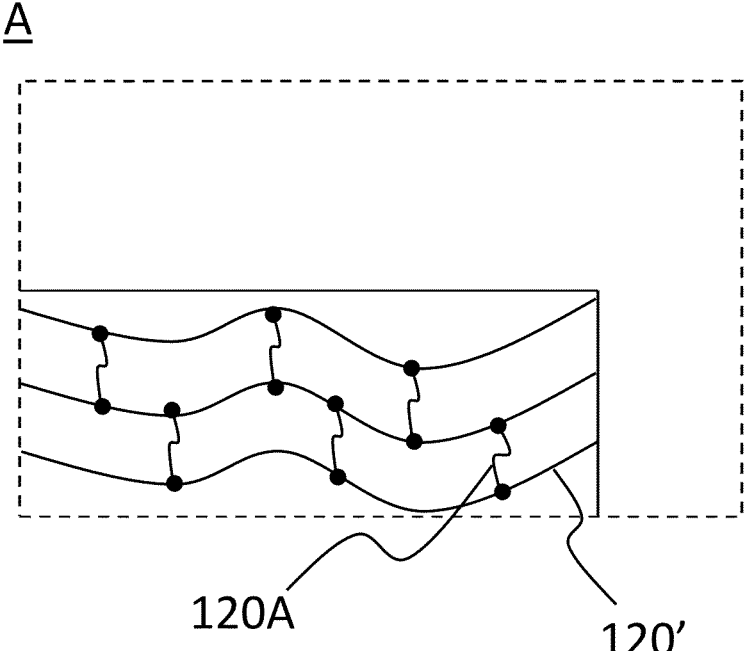
FIG. 2 is an enlarged view of area A in FIG. 1E showing representative cross-linking structure of a polymer separator membrane for separation of electrodes in the electrochemical cell according to an embodiment of the present invention.

Turning to FIG. 2, an enlarged view of area A, as indicated in FIG. 1C, is shown. FIG. 2 is a representative schematic diagram showing the bonding relationship among the irradiated polymer separator membrane 120'. After the irradiation by the energy beam 1100, free radicals of the polymer separator membrane are excited, and cross-linking reaction takes place within the irradiated polymer separator membrane 120' to form cross-linking chemical bonds 120A.

The extent of cross-linking in the polymer separator membrane 120' is assessed by the standard method of gel content (insoluble fraction). Measurements of the gel content of the irradiated polymer separator membrane 120' are obtained according to the standard of ASTM D-2765, using a 20 h Soxhlet extraction cycle, with p-xylene as the solvent at 150° C. Irganox 1010 is added at 0.5 wt % to inhibit polymer separator membrane 120' degradation during the extraction. Approximately 0.3 g of the irradiated polymer separator membrane 120' is cut into small pieces and placed in a pre-weighted stainless steel fine wire mesh. After the extraction cycle, the sample is washed with acetone and vacuum dried to a constant weight. The gel content (gel fraction) is calculated as the percentage ratio of the final weight of the polymer to its initial weight. The irradiated polymer separator membrane 120' has a gel content (gel fraction) in a range between 30% and 90%.

Figure 1D:
Figure 1E:
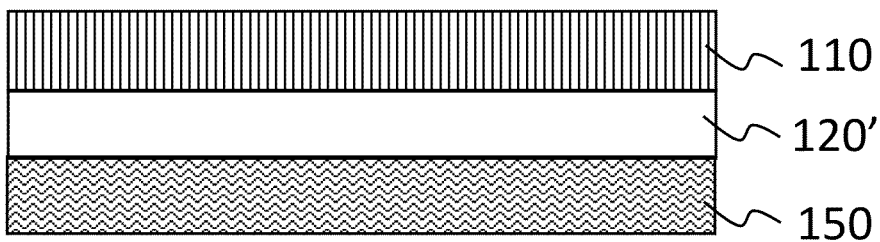

Turning to FIG. 1D, an anode 150 is provided. The anode 150 can be made from graphene based complex or lithium metal. Turning to FIG. 1E, the irradiated polymer membrane 120', the cathode 110, and the anode 150 are compressed together. The irradiated polymer membrane 120' is placed between the cathode 110 and the anode 150. After compression, the irradiated polymer membrane 120' has a thickness in a range between 3 and 30 μm. Subsequently, an electrolyte (not shown) is provided. An electrochemical cell 10 in accordance with an embodiment of the present invention is completed. The shrinkage rate of the formed separator is less than 30% at 140° C. In one embodiment, the shrinkage rate of the irradiated polymer membrane 120' is less than 25% at 140° C.

In one embodiment, ceramic particles in polymeric binders are used with the polymer separator membrane. Turning to FIG. 3A, a cathode 110 is provided. The cathode is alkaline metal salts, transition metal salts, and their complexes. Next, turning to FIG. 3B, a polymer separator membrane 122 is provided. The polymer separator membrane 120 is in the shape of a plane and has at least two flat surfaces opposite each other. The polymer separator membrane 120 can be made from polypropylene, polyethylene, polyvinylidene difluoride, polyimide, polyacrylonitrile or combinations thereof. The polymer separator membrane can be made by wet or dry extrusion, electrospinning, melt spinning, or a combination thereof. For the purpose of clarity, the cathode 110 is not shown in FIGS. 3B to 3D. A coating is formed on the polymer separator membrane 122. The coating includes polymeric binders and ceramic particles. The polymeric binders 130 are applied on the opposing surfaces of the polymer separator membrane 122. The polymeric binders 130 are applied on the polymer separator membrane 122 through various coating processes such as dip coating, spray coating, or doctor blade coating. The polymeric binders 130 can be made from silane, acrylate, epoxy, urethane, polyolefin, ether, or a combination thereof. A plurality of ceramic particles 140 is disposed in the polymeric binders 130. The ceramic particles 140 are disposed in the polymeric binders 130 by spray coating, dip coating, doctor blade coating, pad-dry-cure coating or wiping. The ceramic particles 140 can be made from CaO nanoparticles, MgO nanoparticles, $Al_2O_3$ nanoparticles, $B_2O_3$ nanoparticles, $SiO_2$ nanoparticles, $ZrO_2$ nanoparticles, $SnO_2$ nanoparticles, nanoclay, or a combination thereof. An individual ceramic particle 140 has a particle size between 10 and 100 nm or between 10 and 50 nm. In one embodiment, the ceramic particles 140 that have a particle size between 10 nm and 50 nm bind more tightly to the surface of the polymer separator membrane 122. The resulting electrochemical cell features a thinner profile, which is associated with higher thermal resistance.

Turning to FIG. 3C, the polymer separator membrane 122, the polymeric binders 130, and the ceramic particles 130 undergo irradiation. An energy beam 1100 is shone onto the polymer separator membrane 122. As previously discussed, the irradiation may be performed in more than one cycle under different combination of radiation dose and time period.

Turning to FIG. 4, an enlarged view of area B, as indicated in FIG. 3C, is shown. FIG. 4 is a representative schematic diagram showing the bonding relationship between the irradiated polymer separator membrane 122'. After the irradiation by the energy beam 1100, a cross-linking reaction takes place within the irradiated polymer separator membrane 122' to form cross-linking chemical bonds 120A. The ceramic particles 140 are joined with the polymer separator membrane 122' through the polymeric binder bond 130A. The irradiated polymer separator membrane 122' has a gel content (gel fraction) in a range between 30% and 90%.

Figure 3D:
Figure 3E:
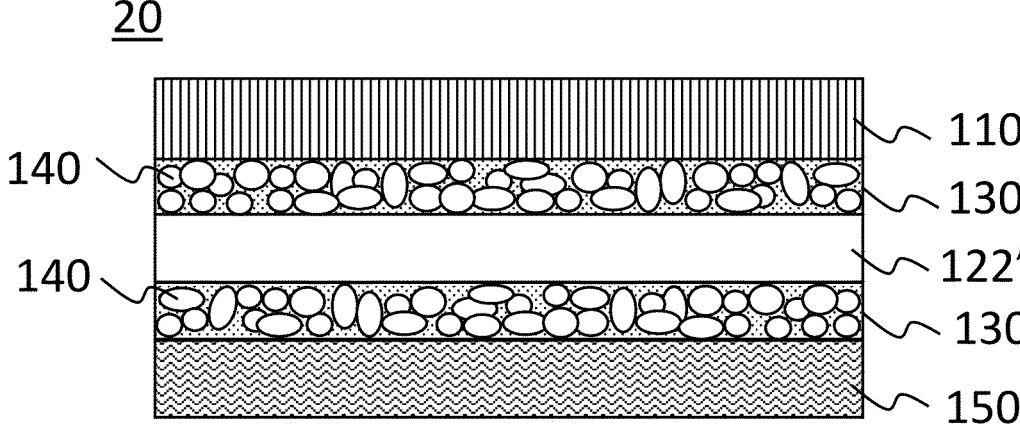

Turning to FIG. 3D, an anode 150 is provided. The anode 150 can be made from graphene-based complex or lithium metal. Turning to FIG. 3E, the irradiated polymer membrane 122', the cathode 110, the anode 150 are compressed together. The irradiated polymer membrane 122' is placed between the cathode 110 and the anode 150. After compression, the irradiated polymer membrane 122' and the polymeric binders 130 and ceramic particles 140 have a combined thickness in a range between 3 and 30 μm. Subsequently, an electrolyte (not shown) is provided. An electrochemical cell 20 in accordance with an embodiment of the present invention is completed. The shrinkage rate of the formed separator is less than 30% at 140° C. In one embodiment, the shrinkage rate of the irradiated polymer membrane 120' is less than 25% at 140° C.

Turning to FIG. 5, a differential scanning calorimetry (DSC) graph is shown. The irradiated polymer separator membranes of samples 1 to 4 (S1 to S4) are made from pure polyethylene in a dimension of 1.5 to 3 mg. Samples 1 to 4 are treated with different radiation doses of 50 kGy, 100 kGy, 150 kGy, and 200 kGy respectively. C1 represents a commercially available polymer separator membrane. The testing profile has an equilibrium temperature at 25° C., and the temperature is raised at 10° C./min to 200° C. The melting points and the enthalpies ($\Delta H$) of the samples are shown in Table 1.

TABLE 1

|  | Melting point (° C.) | Enthalpy of fusion (J/g) |
| --- | --- | --- |
| S1 | 139.71 | 177.0 |
| S2 | 138.75 | 179.2 |
| S3 | 137.10 | 240.0 |

TABLE 1-continued

|  | Melting point (° C.) | Enthalpy of fusion (J/g) |
|---|---|---|
| S4 | 135.95 | 212.7 |
| C1 | 140.82 | 203.3 |

As shown in FIG. 5, the melting grooves of samples 1 to 4 are much sharper compared to C1. In other words, samples 1 to 4 demonstrated faster phase change. In Table 1, samples 3 and 4 have higher enthalpy compared to sample C1. It indicates that the heat capacities of Samples 3 and 4 are higher, and thereby samples 3 and 4, which are treated with 150 kGy and 200 kGy respectively, have greater thermal stability. Moreover, there is a trend of shifting melting grooves from higher temperature to the lower ones. Specifically, sample C1 has a melting point of 140.82° C., and the melting points gradually decrease from samples S1 to S4. There is a negative correlation with the radiation dose and the melting point. When the radiation dose is higher, for example, 200 kGy, the melting point is the lowest among the 5 samples.

Figure 6A:
Figure 6B:
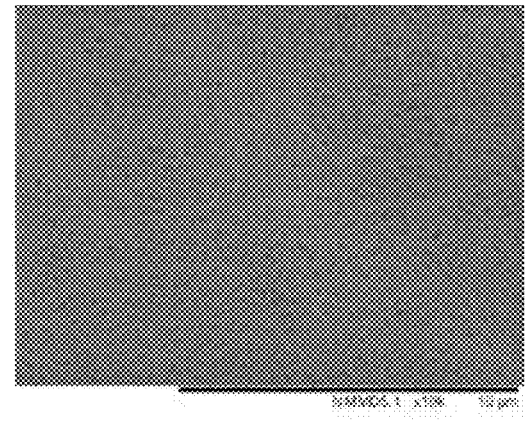
Figure 6C:
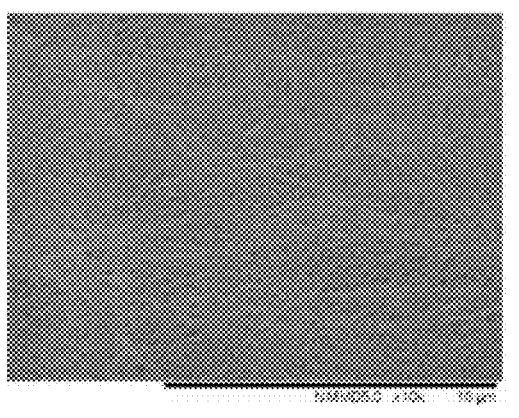
Figure 6D:
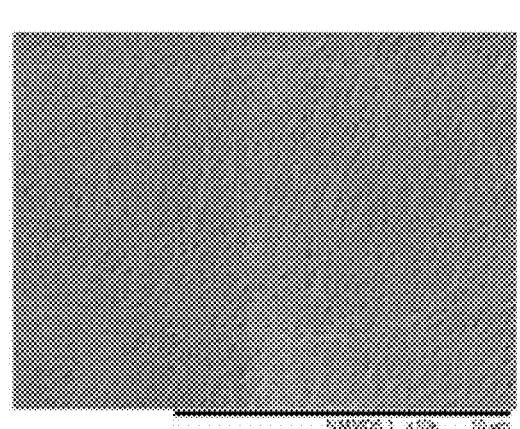
Figure 6E:
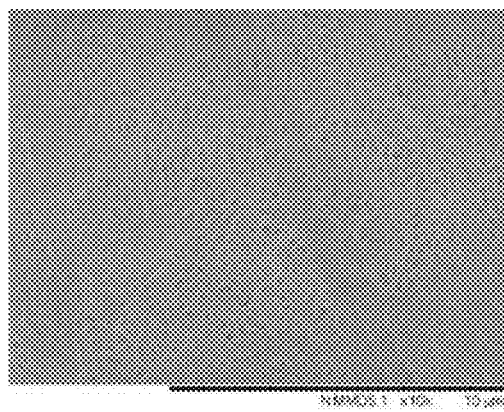

Turning to FIGS. 6A to 6E, SEM analysis images of irradiated polymer separator membranes of samples S5 to S8 and a comparative sample 2 (C2) are shown respectively. It can be seen that after irradiation and without cross-linking agent or initiators, samples S5 to S8, as shown in FIGS. 6A to 6D, show similar morphology as the sample C2, as shown in FIG. 6E. The SEM analysis suggests that the irradiation treatment does not result in morphology change to the irradiated polymer separator membranes.

Figure 7A:
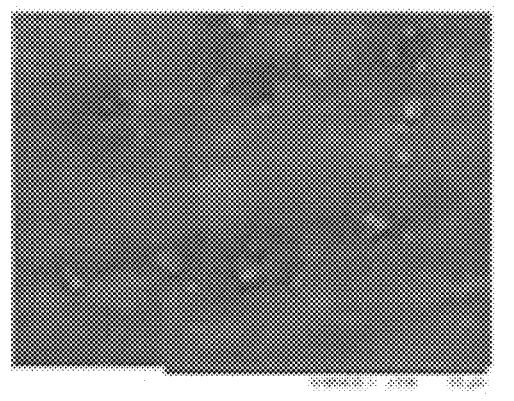
Figure 7B:
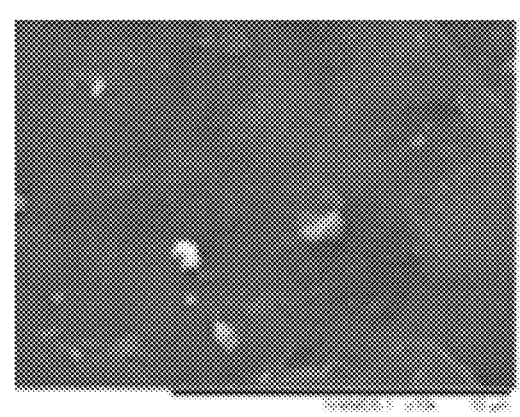
Figure 7C:
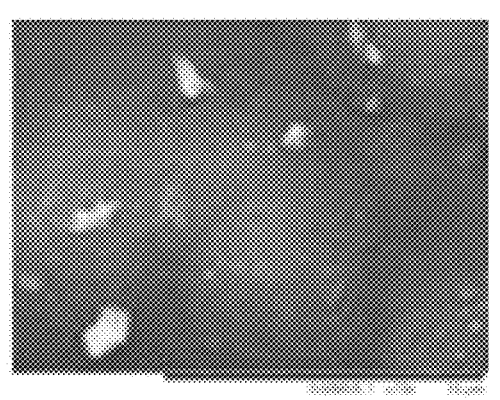
Figure 7D:
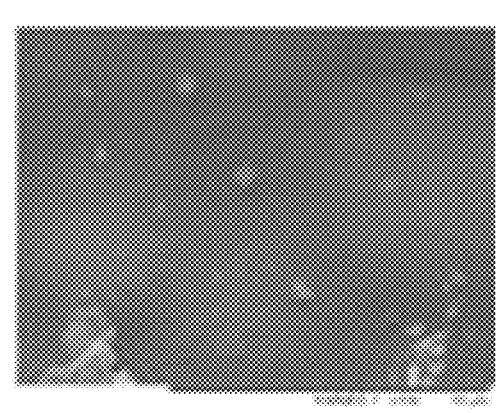
Figure 7E:
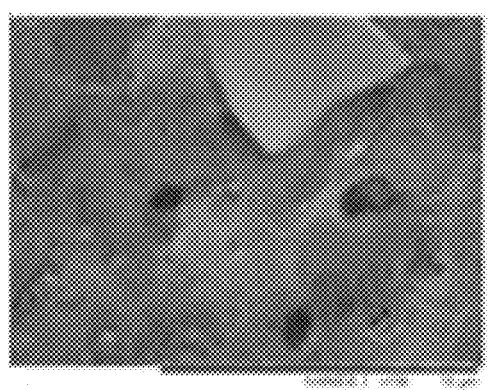

Turning to FIGS. 7A to 7E, SEM analysis are shown after samples S5 to S8 and sample C2 are exposed under 140° C. heat treatment for 1 hour. Samples S5 to S8 are treated with different radiation doses of 50 kGy, 100 kGy, 150 kGy, and 200 kGy respectively. Turning to FIG. 7E, sample C2, which does not undergo irradiation, shows sizable holes and fragmentation after the heat treatment. This is the result of the lack of irradiation treatment to the polymer separator membrane which can be translated as a high shrinkage rate. Turning to FIGS. 7A to 7D, samples S5 to S8 have relatively smooth surfaces after heat treatment. No holes are observed on the irradiated polymer separator membrane. That is, the irradiated polymer separator membrane has higher heat resistance and a lower shrinkage rate.

Thermal Shrinkage Test

Samples S5 to S8 and samples C1 and C2 undergo the following procedure for the thermal shrinkage test. This test simulates the condition when a separator membrane for electrodes in an electrochemical cell is under high temperature. Step 1, an anode is wrapped with a piece of separator membrane and placed into a pouch. Step 2, the pouch is dried at 90° C. Step 3, the dried pouch is placed in a glovebox. Step 4, the anode with the separator membrane is immersed in an electrolyte for 24 hours. Step 5, the anode and separator membrane (in an Al/cPP [cast polypropylene]) are vacuum sealed in a sealing pouch. Step 6, the pouch is heated at 140° C. (±3° C.) for 1 hour. Step 7, the sealing pouch is opened to check the status of the anode and separator membrane.

The shrinkage rate shown in Table 3 is obtained according to the following equation:

$$\frac{A_i - A_f}{A_i}$$

$A_i$ is the initial coverage area of the separator membrane, and $A_f$ is the final coverage area of the separator membrane. The results are shown in Table 3.

TABLE 3

|  | S5 | S6 | S7 | S8 | C1 | C2 |
|---|---|---|---|---|---|---|
| Shrinkage rate | 20% | 20% | 10% | 10% | 50% | 50% |

The calculated shrinkage rates of samples S5 to S8 are lower than the shrinkage rates of samples C1 and C2. In addition, due to the high shrinkage rate, large area of anodes of samples C1 and C2 is exposed, and the electrochemical batteries cease to function. Samples S5 to S8 remain functional because the irradiated separator membrane has a high thermal resistance and low shrinkage rate especially under high working temperature.

The melting point of the polymer separator membrane is in the range between 130 and 145° C. In TD direction, when the temperature rises to approximately 150° C., the unirradiated polymer separator membrane shows the greatest shrinkage rate at −59%. An irradiated polymer separator membrane that undergoes 50 kGy electron beam or gamma ray treatment impedes shrinkage to −56%. An irradiated polymer separator membrane that undergoes 100 kGy electron beam or gamma ray treatment impedes shrinkage to a greater extent of −49%. An irradiated polymer separator membrane that undergoes 150 kGy electron beam or gamma ray treatment impedes shrinkage to the highest of −40%.

In MD direction, when the temperature rises to approximately 150° C., the unirradiated polymer separator membrane shows shrinkage rate to −70%. An irradiated polymer separator membrane that undergoes 100 kGy electron beam or gamma ray treatment impedes shrinkage to −66%. An irradiated polymer separator membrane that undergoes 150 kGy electron beam or gamma ray treatment impedes shrinkage to −60%.

Hot Nail Penetration Test

A hot nail penetration test is conducted to investigate the heat resistance of the irradiated polymer separator membrane. Sample S9 is prepared in accordance with an embodiment of the present invention with an irradiated PE separator membrane. Sample S9 is subjected to a radiation dose of 150 kGy electron beam/gamma ray. A comparative sample C3 is a PE separator membrane without irradiation. Before the hot nail penetration test, all the samples are intact. The samples are placed underneath a hot iron nail which has a diameter of 5.5 mm. The hot iron nail makes contact twice with the samples. The diameters of the holes appearing on the samples are recorded. The morphology observation results are illustrated as cartoon diagrams.

Turning to FIGS. 8A and 8B, the hot iron nail test on samples C3 and S9 is conducted at 186° C. Turning to FIG. 8A, after contact with the hot iron nail at 186° C., sample C3 shows a naked-eye-visible melting collapse 810 of the untreated polymer separator membrane. Turning to FIG. 8B, after contact with the hot iron nail at 186° C., a hole 850 appears on sample S9, and a ring of thin and semi-transparent irradiated polymer separator membrane is observed. In other words, the irradiated polymer separator membrane 860 of sample S9 holds its shape and exerts higher heat resistance, thus protecting its immediately adjacent components by blocking any heat transmission.

Turning to FIGS. 9A and 9B, the hot iron nail test to sample C3 and S9 is conducted at 320° C. (temperature of the iron nail). Turning to FIG. 9A, after contact with the hot iron nail at 320° C., a hole 910 appears and has naked-eye-visible frizzle fringes. Turning to FIG. 9B, after contact with the hot iron nail at 320° C., a hole 950 appears on sample S9, and a ring of thin and semi-transparent irradiated polymer separator membrane is observed. The irradiated polymer separator membrane 960 of sample S9 shows a stronger heat resistance in comparison with untreated sample C3.

Turning to FIGS. 10A to 10C, a hot nail penetration test is performed under a different set of conditions. In this test, the separator membranes are subjected to contact with a 320° C. hot iron nail for 10 seconds. FIG. 10A shows an irradiated separator membrane that is treated with a radiation dose of 100 kGy gamma ray. After the hot iron nail test, a hole 1010 appears and minor frizzle at the edge of the irradiated separator membrane can be observed. In general, the hole 1010 still holds its shape and has neglectable phase change. FIG. 10B shows an irradiated separator membrane that is treated with a radiation dose of 150 kGy gamma ray. A hole 1020 appears, which has a smaller diameter than the other hole 1010. A ring of the irradiated polymer separator membrane 1030 becomes thinner and more transparent around the hole 1020. It suggests that the irradiated polymer separator membrane 1030 undergoes melting to a lesser extent on the membrane, and hence the semi-transparent appearance. These results show that the irradiated separator membrane can effectively protect its immediate components from heat damage and undergo minor phase change. FIG. 10C shows a regular polymer separator membrane without irradiation undergoing the hot iron nail test. Conspicuous heat damage to the polymer separator membrane can be observed, including melting and frizzle.

As used herein, terms "approximately", "basically", "substantially", and "about" are used for describing and explaining a small variation. When being used in combination with an event or circumstance, the term may refer to a case in which the event or circumstance occurs precisely, and a case in which the event or circumstance occurs approximately. As used herein with respect to a given value or range, the term "about" generally means in the range of ±10%, ±5%, ±1%, or ±0.5% of the given value or range. The range may be indicated herein as from one endpoint to another endpoint or between two endpoints. Unless otherwise specified, all the ranges disclosed in the present disclosure include endpoints. The term "substantially coplanar" may refer to two surfaces within a few micrometers ($\mu$m) positioned along the same plane, for example, within 10 $\mu$m, within 5 $\mu$m, within 1 $\mu$m, or within 0.5 $\mu$m located along the same plane. When reference is made to "substantially" the same numerical value or characteristic, the term may refer to a value within ±10%, ±5%, ±1%, or ±0.5% of the average of the values.

The invention claimed is:

1. A method of manufacturing an electrochemical cell having a polymer separator membrane for separation of electrodes in the electrochemical cell comprising:
   providing a cathode;
   providing a polymer separator membrane;

performing a first irradiation to the polymer separator membrane using an energy beam at a first radiation dose for a first duration;

performing a second irradiation at a second radiation dose ranging from 100 kGy to 200 kGy using the energy beam at a second duration, wherein the first radiation dose is lower than the second irradiation, and the first duration is different from the second duration;

providing an anode;

compressing the polymer separator membrane between the cathode and the anode, wherein the polymer separator membrane has a shrinkage rate less than 30% at 140° C.; and providing an electrolyte to form the electrochemical cell;

wherein the polymer separator membrane is maintained at a temperature between 3° and 70° C. during the first and second irradiations and the sum of the first duration and the second duration is 1-20 hours.

2. The method of claim 1, wherein after performing at least one cycle of irradiation on the polymer separator membrane by the energy beam the polymer separator membrane has a gel content of cross-linked polymer separator membrane between 30% and 90%.

3. The method of claim 1, wherein the polymer separator membrane is selected from the group consisting of polypropylene, polyethylene, polyvinylidene difluoride, polyimide, polyacrylonitrile or combinations thereof.

4. The method of claim 1, wherein after the compressing the polymer separator membrane between the cathode and the anode, the polymer separator membrane has a thickness in a range between 3 and 30 $\mu$m.

5. The method of claim 1, wherein providing a polymer separator membrane further comprising
   applying polymeric binders on opposing sides of the polymer separator membrane; and
   disposing a plurality of ceramic particles in the polymeric binders.

6. The method of claim 5, wherein the ceramic particles is selected from the group consisting of CaO nanoparticles, MgO nanoparticles, $Al_2O_3$ nanoparticles, $B_2O_3$ nanoparticles, $SiO_2$ nanoparticles, $ZrO_2$ nanoparticles, $SnO_2$ nanoparticles, nanoclay, or a combination thereof.

7. The method of claim 5, wherein the polymeric binder is selected from the groups consisting of silane, acrylate, epoxy, urethane, polyolefin, ether, and a combination thereof.

8. The method of claim 1, wherein the providing the polymer separator membrane further comprising:
   manufacturing the polymer separator membrane by wet or dry extrusion, electrospinning, melt spinning, or a combination thereof.

9. The method of claim 1, wherein the performing at least one cycle of irradiation on the polymer separator membrane by the energy beam is an electron beam.

10. The method of claim 1, wherein performing at least one cycle of irradiation on the polymer separator membrane by an energy beam is a gamma ray.

* * * * *